(12) United States Patent  
Mohamed

(10) Patent No.: US 8,825,999 B2  
(45) Date of Patent: *Sep. 2, 2014

(54) EXTENDING ENCRYPTING WEB SERVICE

(75) Inventor: Ahmed Mohamed, Sammamish, WA (US)

(73) Assignee: Blackout, Inc., Sammamish, WA (US)

( * ) Notice: Subject to any disclaimer, the term of this patent is extended or adjusted under 35 U.S.C. 154(b) by 1010 days.

This patent is subject to a terminal disclaimer.

(21) Appl. No.: 12/239,214

(22) Filed: Sep. 26, 2008

(65) Prior Publication Data

US 2009/0106550 A1 Apr. 23, 2009

Related U.S. Application Data

(63) Continuation-in-part of application No. 12/182,948, filed on Jul. 30, 2008, and a continuation-in-part of application No. 12/202,027, filed on Aug. 29, 2008.

(60) Provisional application No. 61/090,974, filed on Aug. 22, 2008, provisional application No. 60/981,490, filed on Oct. 20, 2007, provisional application No. 60/981,493, filed on Oct. 20, 2007.

(51) Int. Cl.
*H04L 29/06* (2006.01)
*G06F 17/30* (2006.01)
*G06F 7/04* (2006.01)
*H04L 9/08* (2006.01)

(52) U.S. Cl.
CPC ........ *H04L 63/0428* (2013.01); *H04L 63/0823* (2013.01); *H04L 63/0442* (2013.01); *H04L 29/06* (2013.01)
USPC ............ 713/153; 713/156; 380/282; 380/284

(58) Field of Classification Search
CPC . H04L 63/0428; H04L 63/0823; H04L 63/08; H04L 63/0442; H04L 29/06
USPC .......... 713/150–159, 168–174; 709/203, 229, 709/217–219, 225; 726/22–23
See application file for complete search history.

(56) References Cited

U.S. PATENT DOCUMENTS

| | | | |
|---|---|---|---|
| 6,754,827 B1 | 6/2004 | Cane et al. | 713/193 |
| 7,280,956 B2 | 10/2007 | Cross et al. | 713/171 |
| 7,415,608 B2 | 8/2008 | Bolosky et al. | 713/165 |
| 7,428,751 B2 | 9/2008 | Oom Temudo de Castro et al. | 726/10 |
| 7,454,612 B2 | 11/2008 | Bolosky et al. | 713/168 |
| 7,694,154 B2 | 4/2010 | Youn et al. | |
| 7,770,206 B2 | 8/2010 | Dillaway et al. | 726/2 |
| 2007/0033400 A1* | 2/2007 | Senez | 713/168 |
| 2007/0067620 A1* | 3/2007 | Jevans | 713/156 |
| 2007/0283443 A1 | 12/2007 | McPherson et al. | 726/1 |
| 2008/0209225 A1 | 8/2008 | Lord et al. | 713/185 |
| 2011/0066844 A1* | 3/2011 | O'Toole, Jr. | 713/153 |

* cited by examiner

*Primary Examiner* — Evans Desrosiers
(74) *Attorney, Agent, or Firm* — Knobbe, Martens, Olson & Bear, LLP

(57) ABSTRACT

A data encryption service is provided over the Internet. Users specifying only authorized users' identity information can share encrypted information without sharing passwords or accessing public key certificates. A user sends data to be encrypted to a trusted EWS, along with authorization information. An encrypted data envelope including signed encrypted data blocks, authorization information, and a digital signature is returned to the user. When a second user attempts to access the data inside the encrypted data envelope, it is transmitted to the EWS. If the EWS authenticates the second user, determines that tampering has not occurred, and verifies the second user's identity against the authorization information in the data envelope, then the data are returned. The encrypted data envelope can be expressed as a raw byte stream or encoded within an HTML file to enable browser-based data envelope submission and retrieval.

25 Claims, 14 Drawing Sheets

EXTENDING ENCRYPTING WEB SERVICE

RELATED APPLICATIONS

This application is based on a prior copending provisional application Ser. No. 61/090,974, filed on Aug. 22, 2008, and copending provisional applications, Ser. No. 60/981,490, and Ser. No. 60/981,493, both filed on Oct. 20, 2007, the benefit of the filing date of which is hereby claimed under 35 U.S.C. § 119(e). This application is also a continuation-in-part (CIP) of copending patent application Ser. No. 12/182,948, filed on Jul. 30, 2008, and Ser. No. 12/202,027, filed on Aug. 29, 2008, the benefit of the filing date of which is hereby claimed under 35 U.S.C. § 120.

BACKGROUND

The problem of sharing private or sensitive data over insecure networks is currently solved by using Public Key Infrastructure (PKI) systems. PKI is based on the concept that each identity or user has a public/private key pair. The public key is shared and made available for everyone and need not be secure. In contrast, it is very important to maintain the private key secret, and it must be carefully protected by the holder to maintain the security of the data with which the key pair is used.

The public key is used to encrypt data before the encrypted data are transmitting to a recipient who holds the private key and who is thus able to employ the private key to decrypt the data. A simple example illustrates how the PKI process is employed by two users, A and B, who are sharing sensitive information over an insecure network. First, user B sends user A the public key of the public/private key pair of user B. User A then encrypts the sensitive data with user B's public key and sends the encrypted data to user B over the insecure network. User B uses his private key to decrypt the encrypted data, thereby gaining access to the data.

This PKI model works well as long as user A is certain that user B has actually sent the public key belonging to user B that was received by user A. The concern is that the public key being used by user A to encrypt the sensitive data might have been replaced with a false public key, e.g., by a hacker who has intercepted the actual public key of user B in transit and transmitted a false public key to user A in its place. In order for user A to validate the authenticity of user B's public key, user A contacts an external certificate authority (CA) that can be trusted to correctly validate the public key. The CA is a trusted entity that verifies user identities and generates digital certificates for users that contain information about the certificate holders. The CA also acts as a verification mechanism for digital certificates and when presented with a digital certificate, can verify the information in the digital certificate. The digital certificate contains the holder identity and public key, along with other information that is given to the CA to include when generating a new certificate. Accordingly, if the CA validates the public key that user A has received as being that of user B, then user A can feel secure in employing it to encrypt the sensitive data for transmission to user B.

One of the key drawbacks of the current PKI model is that every user must undergo a verification process in order to obtain a valid certificate from a certificate authority. This requirement limits the use of the PKI model to controlled computing environments, such as within corporate networks, where the users have already passed through the verification process for other reasons. Users who wish to employ their private identities, such as in Internet emails, have no mechanism to easily obtain a third party verification of their identity or enroll in a certificate authorization service to obtain a private certificate, without undergoing complex messaging and verification processes. Also, the recurring cost of obtaining renewable private certificates is not economical for most users. Ideally, the verification process should be totally transparent, without any cost to the end user, which is one of the reasons that the PKI-based system is limited to corporations and other closed environments and not generally available to independent users.

Accordingly, it would be desirable to be able to use open authentication providers as the primary mechanism to verify a user identity, without recourse to a certificate service. Users might then choose between many different types of authentication providers, such as their bank or their Internet email provider, to provide proof of their identity. Once users have signed into an account or website run by such authentication providers and have thus established proof of their identity at a point in time, that proof might then be used to access encrypted content in a document or other type of file. This and other advantages of an alternative to the PKI system for enabling users to establish their identity and facilitate the secure exchange of protected content with other parties will be evident from the following discussion.

SUMMARY

Accordingly, an exemplary method is disclosed below that is useful for protecting (i.e., insuring the security of) information exchanged between entities. This method includes the step of enabling a first entity to securely transmit information that is to be protected, and authorization information that can be used to determine who is authorized to access that information, to a trusted service, over a communication link. The trusted service is then employed to encrypt both the information that is to be protected and the authorization information, within an encrypted data envelope. The encrypted data envelope is securely transmitted to the first entity over a communication link, so that the first entity can subsequently convey the encrypted data envelope to one or more other entities authorized to access the information being protected.

A second entity who has been provided the encrypted data envelope can securely transmit the encrypted data envelope to the trusted service over a communication link. The trusted service decrypts the encrypted data envelope in order to access the authorization information. The authorization information is used for determining if the second entity is authorized to access the information in the encrypted data envelope. If so, then the trusted service decrypts the encrypted data envelope to access the information. This information is securely transmitted from the trusted service to the second entity over a communication link. However, if the second entity is not authorized to access the information in the encrypted data envelope, then the trusted service returns an access denied status to the second entity.

The authorization information can include, for example, an access control list that indicates one or more entities authorized to access the information. Or, it can comprise a network address indicating a location of an access control list that indicates one or more entities authorized to access the information. An authorization service that is at the location indicated by the network address can provide the access control list to the trusted service.

The first entity can transmit the information to be protected and the authorization information to the trusted service comprising an encrypting web service (EWS) over a public network, such as the Internet, using a secure communication link.

In one exemplary embodiment, the first entity can employ a file encryption key (FEK) to encrypt data, producing encrypted data that will be conveyed to the one or more other entities. In this embodiment, the information to be protected comprises the FEK. The encrypted data envelope returned from the trusted service can then be incorporated in a logical structure of an encrypted file that includes the encrypted data, so that the encrypted file can be conveyed to the one or more other entities who will be accessing the data. Further, in this embodiment, the information returned from the trusted service to the second entity comprises the FEK. In this embodiment, the method further includes the step of enabling the second entity to use the FEK to decrypt the encrypted file, in order to access the data included therein.

In one or more exemplary embodiments, at least one of the first entity and the second entity can comprise a software program or application that is executing on a computing device.

In at least one exemplary embodiment, the method can also include the step of causing the trusted service to digitally sign the information that is to be protected and the authorization information, to produce a digital signature. The digital signing can be done before producing the encrypted data envelope that is returned to the first entity, so that the digital signature can be included in the encrypted data envelope. After the second entity securely transmits the encrypted data envelope to the trusted service for decryption, the method can then further include the step of employing the trusted service to extract the digital signature included in the encrypted data envelope, after decrypting the encrypted data envelope. The trusted service then digitally signs the authorization information and information to be protected that were in the encrypted data envelope, to produce a test signature. The test signature can then be compared with the signature that was extracted. If the signatures do not match, the trusted service can return an access denied status to the second entity, but will otherwise continue with processing the request for decrypting the encrypted data envelope.

An authentication service can be employed to confirm an identity of the second entity before enabling the second entity to access the information in the encrypted data envelope. For example, a current user token can be transmitted from the second entity to the trusted service when requesting the encrypted data envelope be decrypted. The trusted service can then attempt to map the current user token to a user identity maintained by the authentication service. Again, an access denied status will be returned to the second entity, if the current user token cannot be mapped to a user identity maintained by the authentication service, to indicate that the second entity is not authorized to access the information in the encrypted data envelope. Otherwise, the trusted service will return the information to the second entity.

Another aspect of the present novel technology is directed to an exemplary system for protecting information exchanged between entities. The system can include a plurality of computing devices, each having a network interface, and a processor coupled to the network interface and to a memory in which machine instructions are stored. When executed by the processors, the machine instructions cause functions to be performed that are generally consistent with the steps of the method discussed above. Yet another aspect of the novel technology is directed to memory media for storing machine instructions, which when executed by a processor, carry out functions that are also generally consistent with the steps of the above-described method.

This application specifically incorporates by reference the disclosures and drawings of each patent application and any issued patent identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
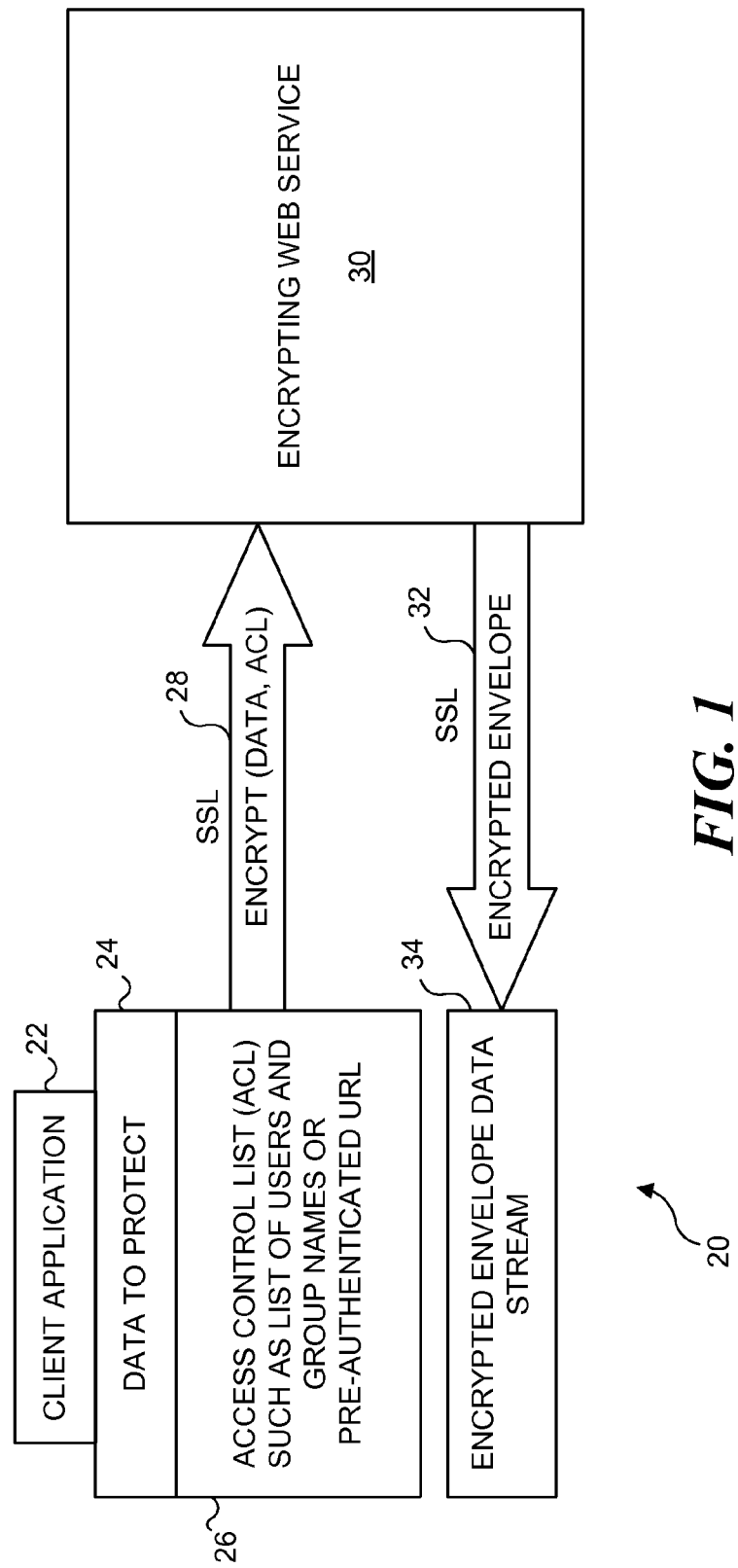
FIG. 1 is a functional block diagram illustrating an exemplary encrypting web service (EWS) "Encrypt method;"

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview of the Novel Approach for Using Encrypting Web Service (EWS)

Exemplary embodiments of a novel system and method enable users to securely share sensitive information over insecure data networks. In this approach, a trusted EWS enables users to encrypt information and specify authorization information that controls the set of users who can gain access to the information. Users communicate with the EWS over a network, e.g., the Internet, using a secure encrypted data channel, such as the HTTP Secure Socket Layer (SSL). Users and applications are required to verify the EWS identity when establishing a new connection to it by verifying the EWS website SSL certificate.

The EWS provides two functions for users—encrypt and decrypt methods. An exemplary embodiment of an encrypt method 20, as shown in FIG. 1, accepts arbitrary user data 24 and authorization information 26. The authorized information can comprise an access control list (ACL) including a list of users and/or group names, or a pre-authenticated uniform resource locator (URL) controlling who has access to data 24. A user (who may be running a client application 22) calling the encrypt method is authenticated via an authentication service to determine or validate the user's identity. Data 24 and authorization information 26 are conveyed through a secure socket layer (SSL) transmission 28 or other secure transmission means, to an EWS 30. EWS 30 encapsulates the data and authorization information, along with the calling user's identity, the current time, and the user's Internet Protocol (IP) address into an encrypted data envelope. The data envelope is then signed with the private key of the EWS and the digital signature is added to the data envelope. The data envelope is next encrypted with the EWS symmetric encryption key. The encrypt method completes and returns the resulting encrypted data envelope to the caller through another SSL transmission 32 as an encrypted envelope data stream 34. Since the user data are not persisted or stored in the EWS, the EWS is able to scale to provide its services to a very large number of users.

An encrypted data envelope can be distributed to other users over any communication channel, including insecure networks. When a second user receives the encrypted data envelope, an EWS decrypt method can be called to access the data inside the envelope.

Figure 2:
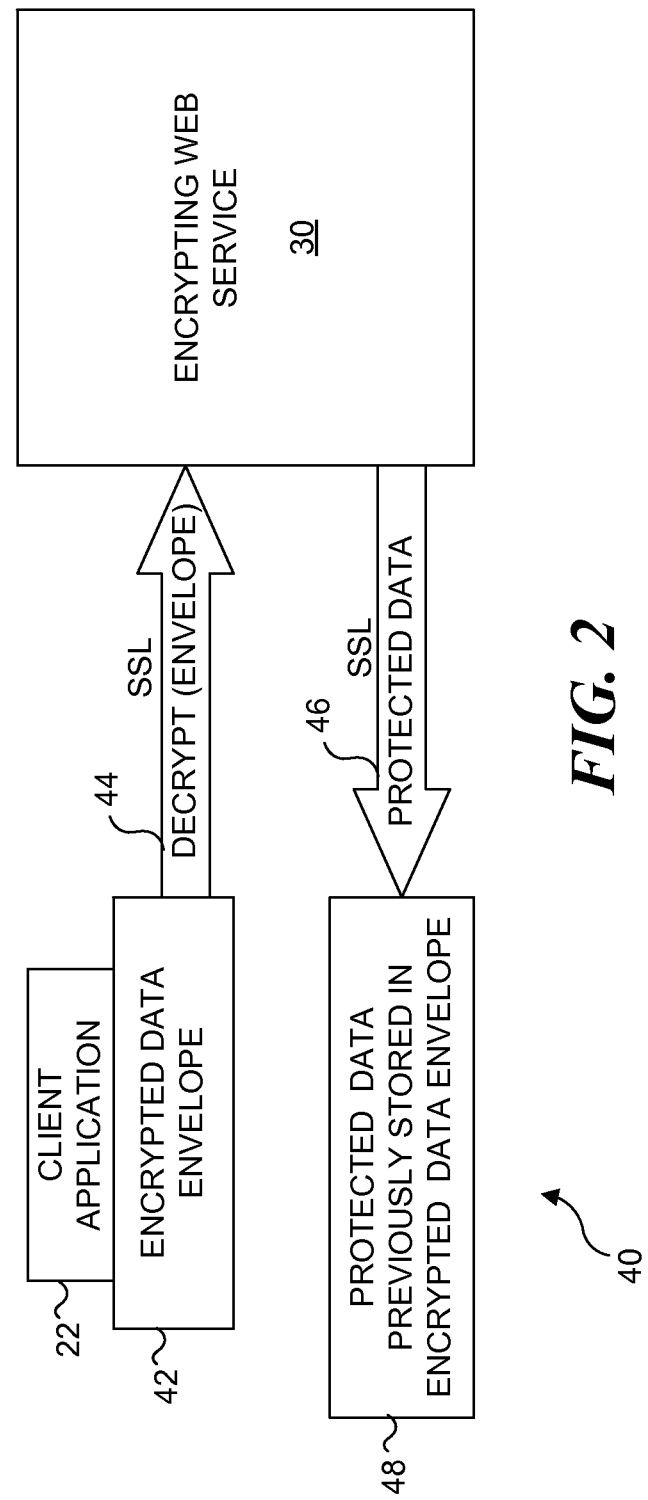
FIG. 2 is a functional block diagram illustrating an exemplary EWS "Decrypt method;"

An exemplary EWS decrypt method 40 is shown in FIG. 2. This decrypt method can run in response to a user action or under client application 22. EWS 30 accepts as input an encrypted data envelope 42, which is transmitted to the EWS by SSL transmission 44 (or other secure transmission means), and returns protected data 48 included therein, e.g., via another SSL transmission 46, but only if the calling user is authorized to access the data, as expressed by the authorization information stored in the data envelope. If not, the EWS returns an access denied error to the caller, and the caller is unable to access the protected data.

The caller of the decrypt method is first authenticated by the web encrypting service using an authentication service. Once the caller identity is authenticated, the EWS verifies the integrity of the encrypted data envelope. The EWS decrypts the encrypted data envelope using its private encryption key and extracts the envelope digital signature previously stored therein. It then computes another envelope digital signature and compares it with the extracted digital signature. If the two digital signature values match, then the encrypted data envelope is considered valid; otherwise, the encrypted data envelope is considered invalid, and the call fails with an error, precluding the caller from accessing any protected data that might be included in the encrypted data envelope.

After the two digital signatures are compared and have been found identical, the EWS extracts the authorization information from the envelope and evaluates the caller identity against it. If the caller has been granted access to the data envelope, then the decrypted user data included in the encrypted data envelope are returned to the caller. Otherwise, the web service returns an access denied error to the caller, precluding access of the data in the data envelope.

Figure 3:
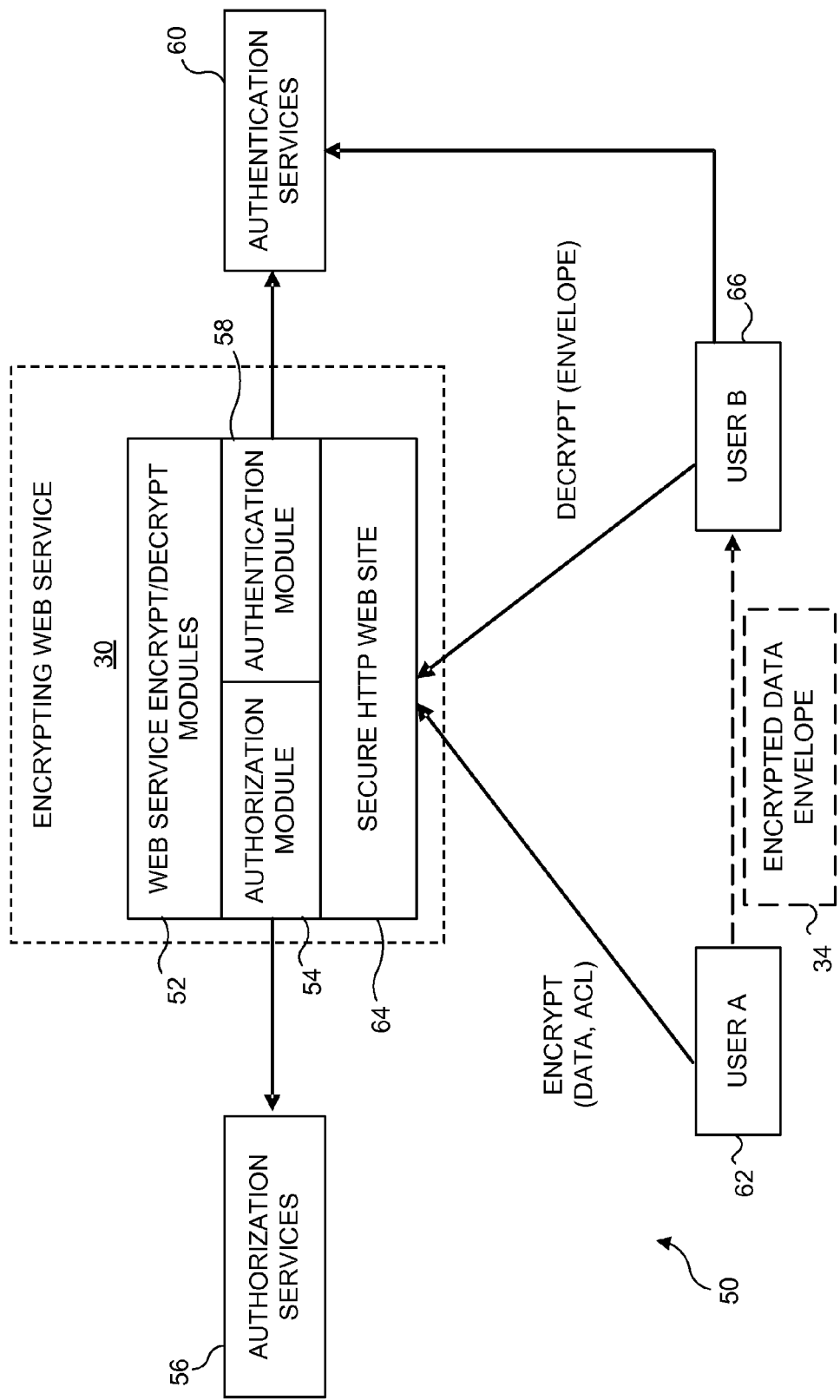
FIG. 3 is a block diagram showing the functional components involved when a user A sends data to a user B and employs the EWS in accord with the present novel method.

FIG. 3 depicts an exemplary overall system architecture 50 of EWS 30, which includes web service encryption and decryption modules 52, an authorization module 54 that is coupled to authorization services 56, an authentication module 58 that is coupled to authentication services 60, and a secure hypertext transfer protocol (HTTP) web site 64. A user A in a block 62 can connect to secure HTTP web site 64 over the Internet (or other network) to encrypt data and the ACL or other authorization information, receiving back encrypted data envelope 34, which can be conveyed to a user B in a block 66. User B, who is authenticated by authentication services 60, can request decryption of the encrypted data envelope, to access the protected data, by also connecting with secure HTTP web site 64 of the EWS.

The EWS is stateless and doesn't store any information besides its secure HTTP certificates, symmetric encryption keys, and signing private/public keys, which is a key distinguishing feature of this system in comparison to other systems used for cryptographically protecting data. The user data received on the encrypt method is not stored nor persisted by the web encrypting service.

The EWS can benefit from a prior commonly owned U.S. patent application entitled, "Method And System for Extending Encrypted File System," U.S. Ser. No. 12/182,948, which was filed Jul. 30, 2008, to create and process encrypted data envelopes. The encrypt method of the EWS corresponds to the process for creating a new encrypted file with the user data and authorization information stored inside it, using the system disclosed in this prior patent application. However, in the present novel approach, the resulting encrypted data file is returned as encrypted data envelope 34 (FIGS. 1 and 3).

Similarly, the decrypt method of the EWS corresponds to reading the user data and authorization information from the encrypted data envelope, which represents a raw encrypted file in the prior patent application, enabling the EWS hosted on Microsoft Corporation's Windows™ operating system to leverage the Windows™ Encrypting File System to implement the encrypt and decrypt methods. Further details of the present novel approach are discussed below.

Models for Using the EWS in Present Novel Approach

The EWS can be used to solve the problem of securely sharing application state or data. In one model, an application using the EWS can employ the present novel approach to protect the state of the application, such as encryption keys or passwords that are used by the application. The application implements its own data encryption scheme to encrypt the user data or files but relies on the EWS to protect the file encryption keys that were used in the encryption scheme. In this model, the separation of applications that are encrypting sensitive user data, and the EWS encrypting the applications' encryption keys enables applications to operate on very large files and more importantly, does not disclose the sensitive user data to the EWS. The drawback of this model is that applications must implement the same encryption method to enable sharing of user data between different client operating environments. This model is outlined in the example below of secure sharing of encryption keys.

In an alternative model, the EWS can be used as an encryption data engine independent of a client environment. This model completely decouples the data encryption from the client environment and enables clients running different operating systems to share encrypted data without having to ensure that there is a common encryption module implemented in each client operating system. This alternative model is better suited for small file sizes so that the time required for sending the data to EWS for encryption/decryption and receiving the encrypted/clear data back is not excessive. This alternative model is illustrated by the secure client-independent encryption example below.

Secure Sharing of Application State

One key function of the EWS is to enable applications to encrypt and share internal state or meta-data over insecure networks. An application uses the EWS to encrypt the application state, which makes the application state securely accessible from different computers and by different users. One example of such an application is a client-based file encryption solution. An application generates an encryption key and uses EWS to protect its encryption key. The application encrypts the user data file through a local encryption module and constructs an encrypted file from the encrypted data envelope that contains the application state and the encrypted user data file.

Figure 4:
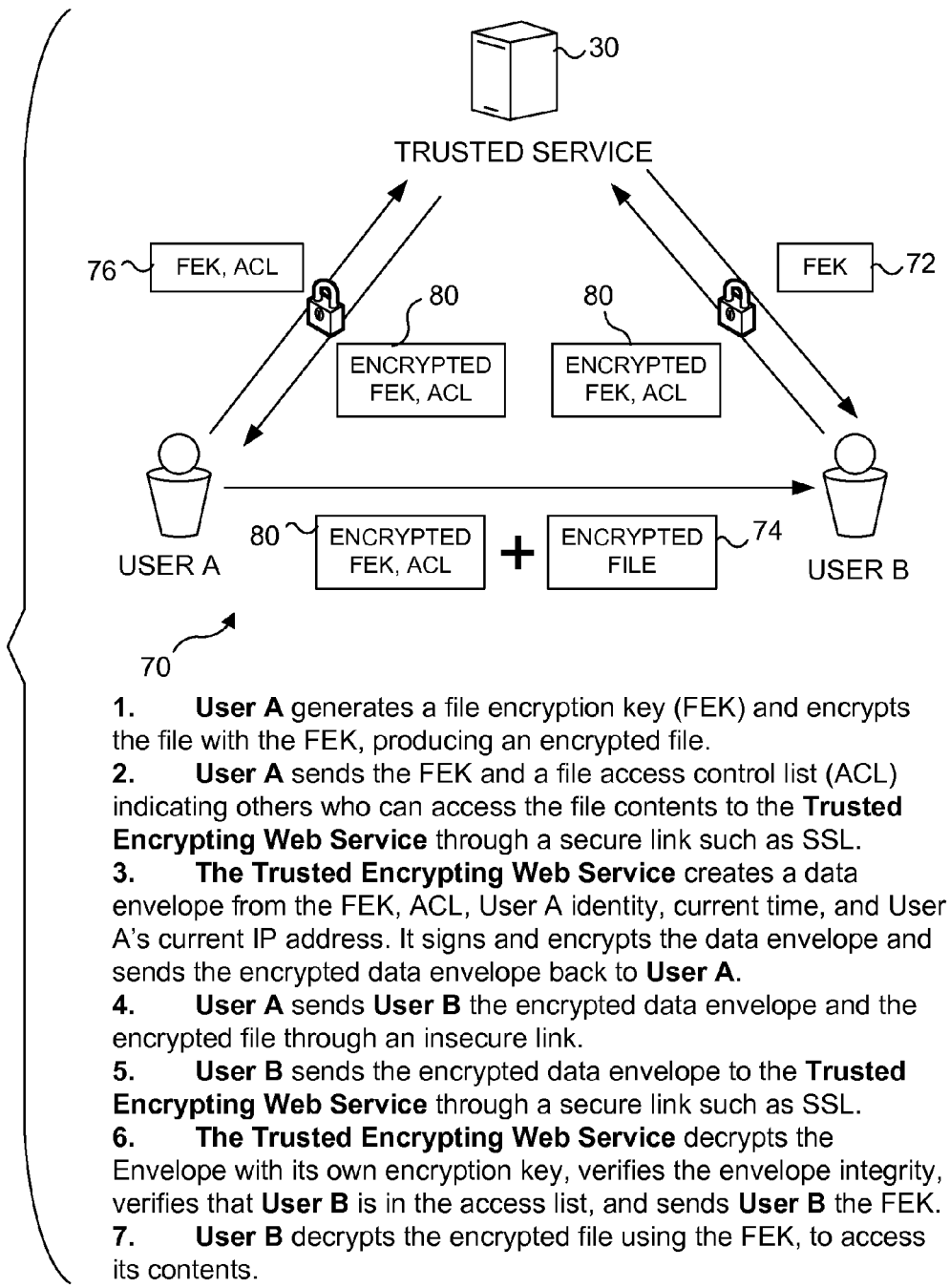
FIG. 4 is a block diagram and a listing of exemplary steps implemented when user A sends an encrypted file to user B by employing the EWS.
Figure 5:
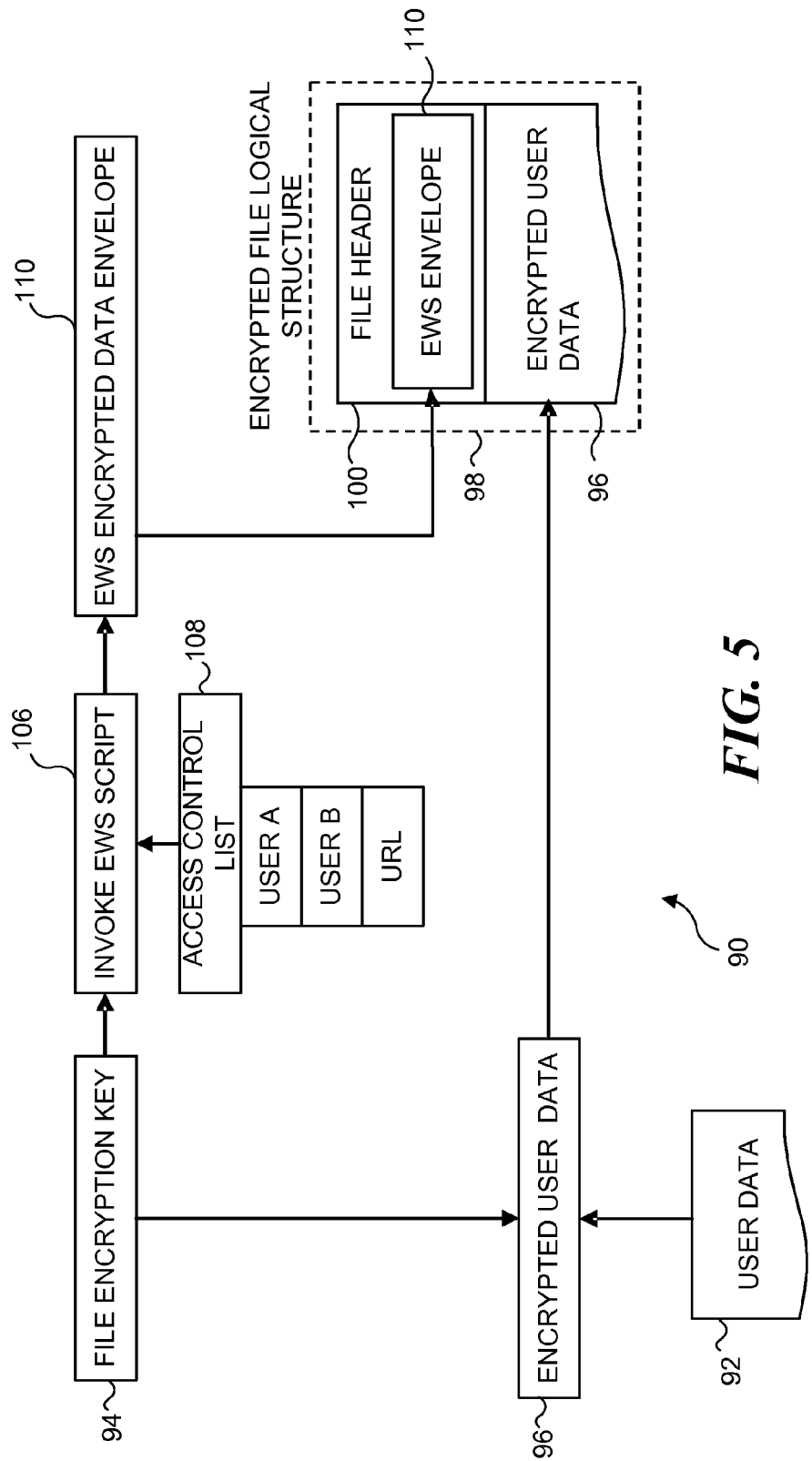
FIG. 5 is a block diagram illustrating user data being encrypted by employing a file encryption key (FEK) that is then transferred to the EWS for inclusion in the encrypted data envelope, as part of the header for the encrypted file.

FIG. 4 depicts a data exchange 70 in which User A and User B use the EWS to securely exchange an encrypted file. An application, running as User A, generates an encryption key and uses it to encrypt the user data. The application calls the encrypt method of EWS 30 via a secure transmission, with the key as data input and a list of users (User B in this simple example) that are authorized to gain access to the data, as indicated in a block 76. A returned encrypted data envelope 80 is then distributed to the authorized users, along with an encrypted user data file 74. FIG. 5, which is discussed below, is a block diagram 90 that illustrates how an application constructs an encrypted file using a locally generated FEK and encrypted data envelope.

Continuing in regard to FIG. 4, when a second application, executing as User B, receives the encrypted data file, along with the encrypted data envelope, e.g., as encrypted file logical structure 98 (FIG. 5), it tries to obtain the encryption key from the encrypted data envelope in order to decrypt the encrypted data file. The application calls the decrypt method of the EWS with the encrypted data envelope in the security context of the user running the application, via a secure transmission to the EWS. The EWS executes the decrypt method as described above and returns a file encryption key (FEK) 72 to the application. The application can then use the FEK to decrypt the user data in encrypted user data file 74.

In block diagram 90 of FIG. 5, a FEK 94 is employed by an application to encrypt user data 92, producing an encrypted user data file 96. An application can then provide FEK 94 and an ACL 108 (which includes, e.g., a User A, a User B, and a URL that are authorized to access the FEK, and thus, to access user data 92) to a block 106, which invokes an EWS script 106. The EWS script, which runs on the trusted service, returns an EWS encrypted data envelope 110 (corresponding to the encrypted data envelope 80 in FIG. 4). The encrypted user data and the encrypted data envelope can be combined in an encrypted file logical structure 98, in which a file header 100 includes EWS encrypted data envelope 110, while the file body includes encrypted user data 96.

Figure 6:
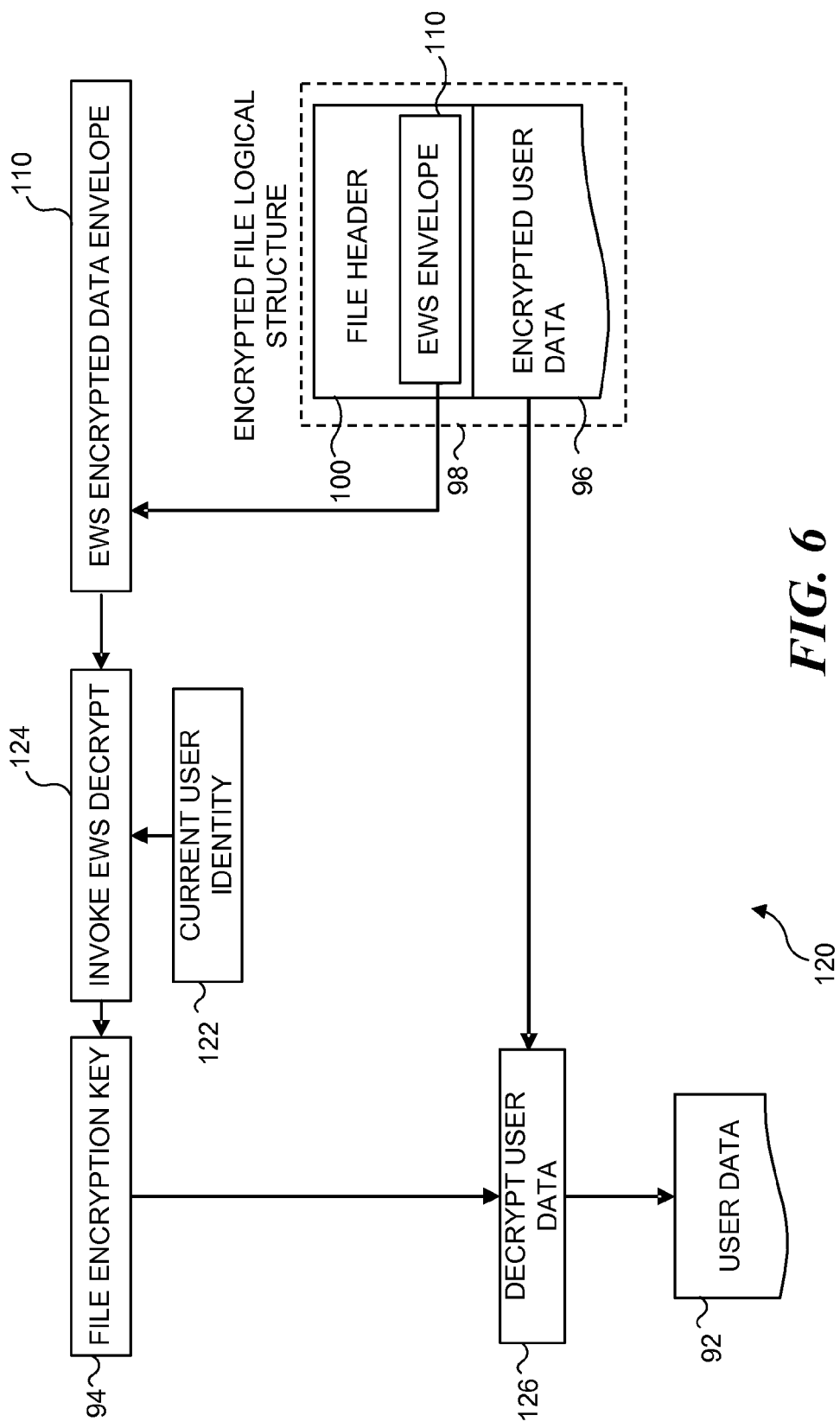
FIG. 6 is a block diagram illustrating an authenticated user accessing information conveyed in an encrypted file by gaining access to the FEK needed to decrypt the encrypted file.

FIG. 6 includes a block diagram 120 illustrating how an application decrypts encrypted user data in encrypted file logical structure 98 using FEK 94, which is embedded inside encrypted data envelope 110. The application/user requesting the decryption provides EWS encrypted data envelope from file header 100 of the encrypted file logical structure to invoke an EWS decryption method in a block 124. The EWS service authenticates a current user identity 122 (the user requesting the decryption) by comparison to the users/URL in the ACL included in the EWS encrypted data envelope. The FEK is then provided to the user if the user is authorized and if the EWS encrypted data envelope is confirmed to be valid. In a block 126, the FEK is then employed by the user to decrypt the encrypted user data, to access user data 92.

Figure 7:
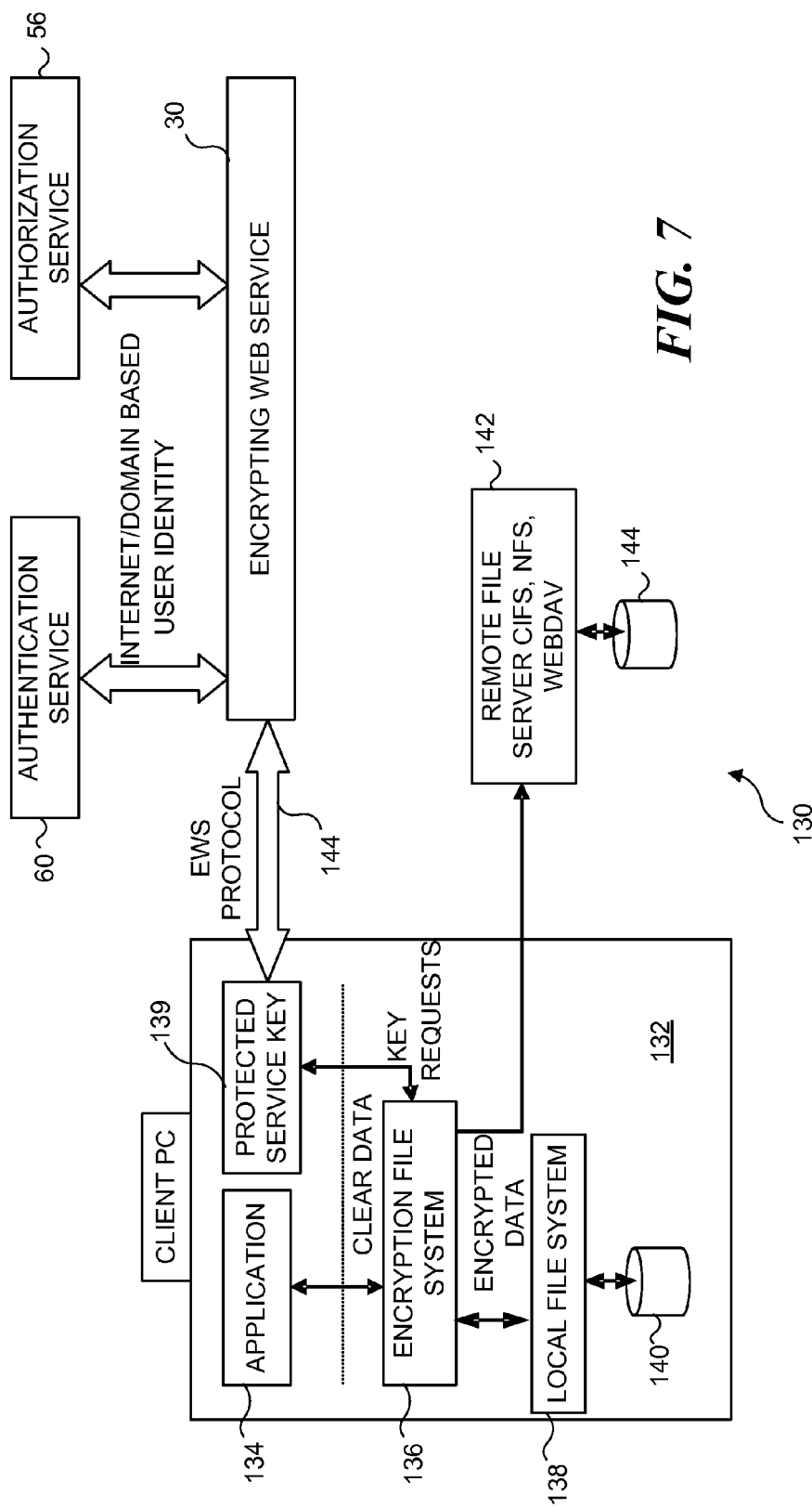
FIG. 7 is a block diagram illustrating an exemplary client encryption file system using the EWS to protect and share its encryption keys.

FIG. 7 is a block diagram 130 illustrating how an encryption file system 136 running on a client personal computer (PC) 132, can respond to an application 134, implementing the present novel approach by leveraging EWS 30 for its encryption key protection and sharing. Encryption file system 136 transparently intercepts file system read/write operations and decrypts/encrypts data as the data are retrieved from and stored to a hard disk 140 (or other type of storage) by a local file system 138, or alternatively, with regard to a remote file server 142, which stores data to and retrieves data from a hard disk 144 (or other type of storage). In addition, the encryption file system communicates with the EWS through a protected service key 139 that issues encrypt/decrypt methods to the EWS via an EWS protocol 144. EWS 30 connects to authentication service 60 and authorization service 56 over the Internet or some other network domain, to determine if the encrypted data envelope is authentic and to confirm that the user identity of a user requesting decryption of the encrypted data file is included in the authorized information that indicates who has authority to access the contents of the encrypted data envelope. As described above, the encrypted data envelope is stored as part of the file encryption meta-data, e.g., in the header of the encrypted file structure. In this manner, an encrypted file can be transparently shared by multiple users and accessed from multiple machines. It should be emphasized that all information exchanged with the EWS uses SSL (or some other form of secure transmission, such as a virtual private network (VPN), or SSH) to protect the file encryption key and authorization information during transmission.

Secure Client Independent Encryption

A second application of the EWS in connection with the present novel approach is to provide clients running different operating systems a data encryption solution that is independent of the type of operating system employed by each client. The advent of the Internet and advances in data communication technology enable web-based encryption service with reasonable overall performance. Users authenticate to the EWS and send data and authorization information via a web form. The data can be specified as a local file to be uploaded to the web encrypting service or a text area that can be filled in online and submitted by the user. The web form is posted to the EWS, which constructs an encrypted data envelope from the submitted data and authorization information. If a file is submitted, its name, including its extension, is captured and stored as part of the encrypted data envelope. The encrypted data envelope is encoded in base64 format and encapsulated into a hypertext markup language (HTML) file. The HTML file consists of a simple HTML file that contains a form to submit the encrypted data envelope to the web encrypting service when opened. The HTML file is downloaded into the client as the result of the form post operation. The availability of web browsers on virtually all computer operating systems makes it ideal to use the HTML file format to encapsulate the encrypted content. This approach eliminates the need to install any additional client software to support sharing of encrypted files.

The HTML file can be shared with other users over insecure channels. When a second user opens the HTML file, the HTML code authenticates the user with the EWS and submits the encrypted data envelope to the EWS to decrypt and recover the data. The EWS decodes the encrypted data envelope and verifiers the user rights against the authorization information in the encrypted data envelope. If the user is among those granted access, the protected data in the encrypted data envelope are returned to the user as a file to download. If the encrypted data envelope contains a file name, the same file name and extension are used in the file download operation.

The HTML submit form can be expressed as follows:

```
<form action="https://www.encryptingwebservice/decrypt.aspx"
method="post" type="multipart/x-www-form-urlencode">
    <input type=hidden name=envelope value= encrypted data
envelope data stream is embedded here >
    <input type=submit value="submit form" >
</form>
```

Since all data encryption and decryption processing occurs in the EWS, there is no software installation requirement on the client systems. Users on different operating systems and functionality levels can exchange encrypted data encapsulated within HTML files without having to ensure that all clients have the same encryption systems, as would be the case if using many conventional encryption methods.

Extensible Authorization Model

The EWS provides a plurality of exemplary authorization models. In a simple authorization model, the encrypt method expresses the authorization information as an ACL of user names or email addresses. In this model the complete authorization information is available to the EWS to verify users during the decrypt method. The authorized user ACL remains fixed for the lifetime of the encrypted data envelope.

One advantage of this model is that there is no requirement on an external authorization service, since the authorization information expresses the complete set of authorized users. However, a drawback of this model is that there is no mechanism to express user groups and there is no mechanism to revoke a user's right of access to an encrypted data envelope.

In order to address these limitations, the EWS enables users to express authorization information from an external authorization service. In such a model, the authorization information can include a URL link to a file that contains the list of authorized users or a web service that returns the list of authorized users, thus using the URL as an indirect means for determining the authorized users. In order for the EWS to access authorization information from an external service, it must authenticate itself to the external service. In one exemplary configuration, the EWS is trusted by the external authorization service. In other configurations, the EWS identity is not inherently trusted by the authorization service, and the EWS must authenticate itself first. This authentication of the EWS is achieved by a secure delegation model that enables the EWS to impersonate the identity of the user who encrypted the envelope, during the decrypt call. The impersonation information is captured during the encrypt call and securely embedded inside the encrypted data envelope.

The EWS enables users and applications to specify a pre-authenticated URL that points to the authorization information during the encrypt call. This pre-authenticated URL indicating an external authorization service returns the ACL of authorized users. The EWS may append the decrypting user identity as a query parameter to the URL if specified in the authorization information. The URL may represent a web directory service or a flat list of users stored at a remote web server. The URL thus indicates the location of the authentication information that enables the web encrypting service to gain access to the users list.

The URL can contain a user identifier, authorization parameters, a timestamp, a verifier cookie, and a signature. The authorization service uses the user identifier in the URL to locate the account password to validate the signature, which ensures that only the holder of the password could have generated the URL. The use of pre-authenticated URLs is a well-known technique used by various web services such as Amazon S3™. A person experienced in the art can use any of the well-known schemes to generate pre-authenticated URLs. One unique concept included in the present novel approach is the ability to apply such a technique to express authorization information that is outside the trust domain of the EWS and is under the control of the encrypting user. In essence, during the decrypt call, the pre-authenticated URL enables the EWS to request authorization information from a remote authorization service in the context of the user that encrypted the content.

Invention Details

The EWS implements two methods—encrypt and decrypt. Before the encrypt or decrypt method can be processed by the EWS, the user is first authenticated via one of the supported authentication services. The following exemplary sequence of steps outline how users can authenticate to the EWS using domain-based authentication or an open Internet authentication service such as Live ID or Open ID. Each authentication provider provides a web-based authentication application programming interface (API) that the web encrypting service uses. The sequence of steps is as follows:

1. The user opens a browser program to sign-in page of the EWS;
2. The sign-in page lists a set of authentication providers that are supported by the EWS;
3. The user selects an authentication provider from the list;
4. The EWS communicates with a selected authentication provider via the user browser redirection;
5. The user is redirected to the selected authentication provider sign-in page;
6. The user enters a username and a password;
7. The user is redirected back to EWS with a user token that can be used as a query parameter;
8. The EWS submits the user token to the authentication service to verify the authentication and obtain a user identity, such as a name or an email address; and
9. The user identity is now determined and is stored as part of the user current session state.

Figure 8:
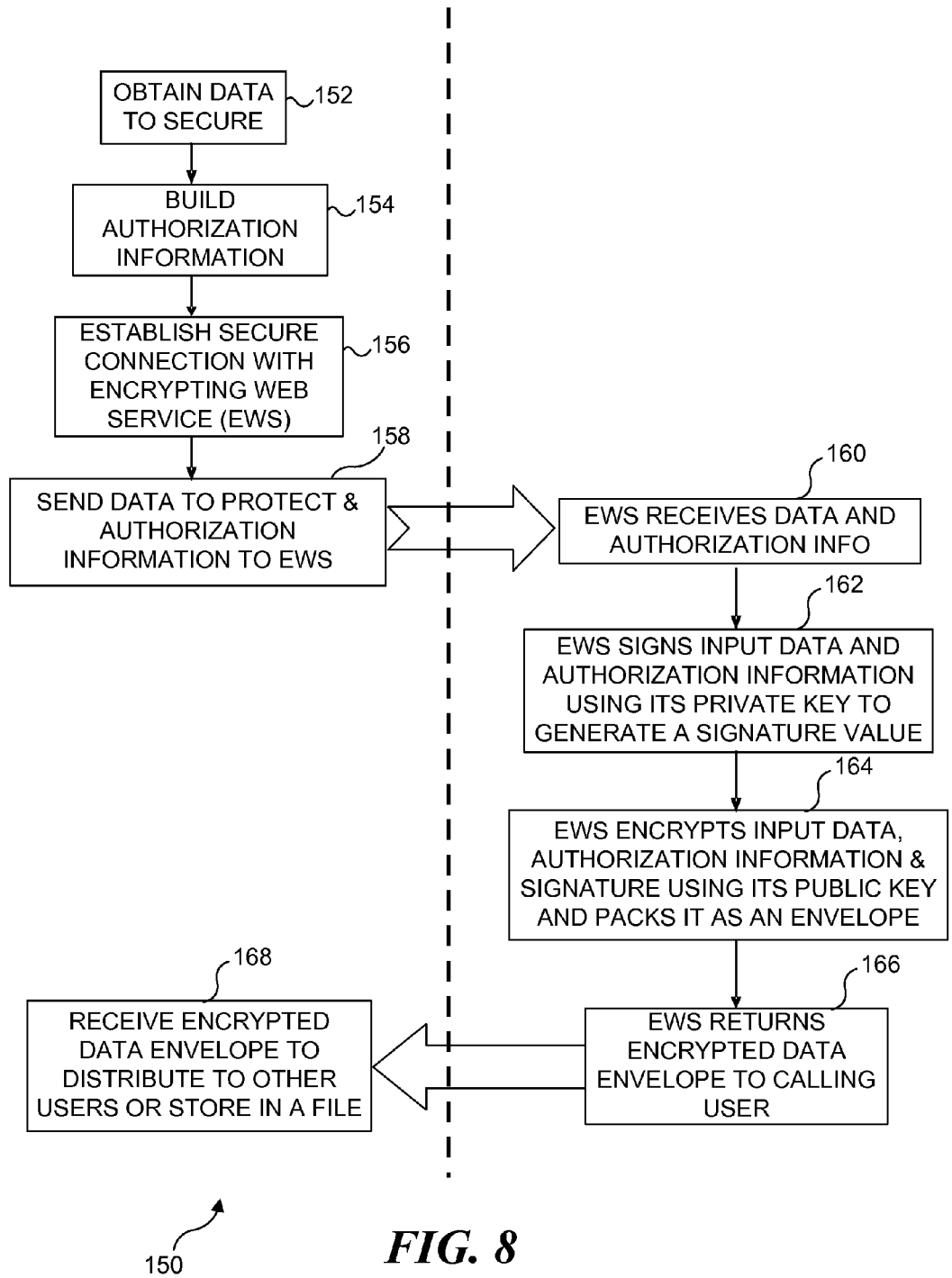
FIG. 8 is a flowchart illustrating exemplary logical steps used to create a new encrypted data envelope.

Encrypt Method:

The encrypt method accepts as input user data and authorization information and returns an encrypted data envelope which is an opaque sequence of byte stream. The authorization information can be an access control list or a pre-authenticated URL to the location of the access control list. FIG. 8 is a flowchart 150 that illustrates exemplary steps implemented in the encrypt method, as follows:

1. The user authenticates to the EWS as described above;
2. The user obtains data to secure in a step 152, and in a step 154, builds authorization information, such as an access control list of user names or email addresses, or a pre-authenticated URL for an external location where the access control list can be obtained; the user then establishes a secure connection (e.g., using SSL transmission) with EWS in a step 156;

3. The user sends the data to be protected with the authorization information to the EWS in a step 158, the EWS receives the data and authorization information in a step 160, verifies that the user is authenticated, and extracts the user identity from the current session state;
4. The EWS creates a buffer in memory that consists of the user data to encrypt, authorization information, user identity, current time and user machine IP address;
5. The buffer is hashed using SHA1 and then signed with a private key of the EWS in a step 162, generating a signature value;
6. The resulting signature value is appended to the buffer;
7. The buffer is encrypted using an encryption algorithm such as AES256 with the EWS symmetric encryption key (i.e., the public key of the EWS) in a step 164; and
8. The encrypted buffer and encryption key identifier are copied into a second memory buffer and returned to the user as the encrypted data envelope, in step 166; in a step 168, the user receives the encrypted data envelope for distribution to other users or to store in a file.

Figure 9:
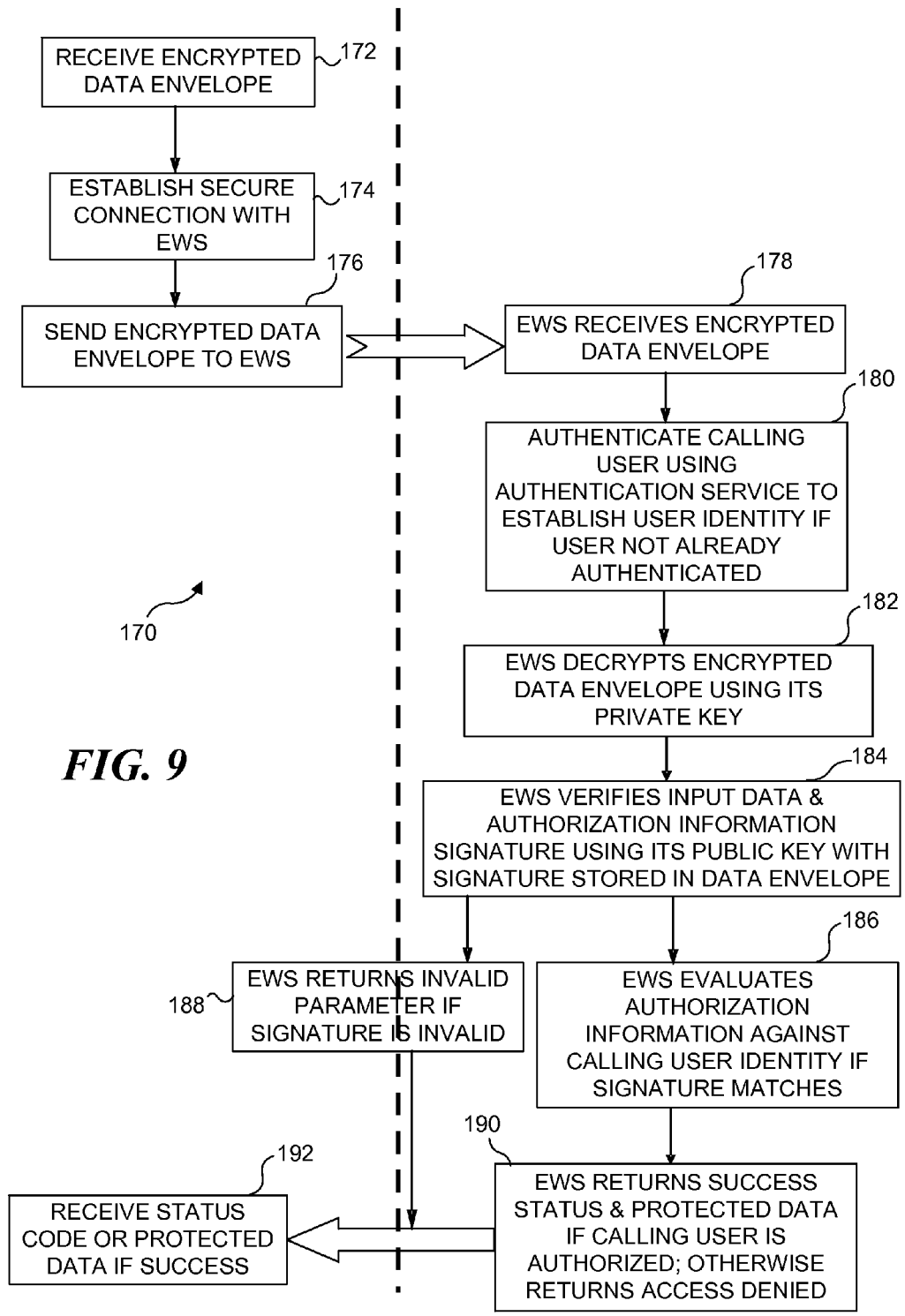
FIG. 9 is a flowchart illustrating exemplary logical steps used in the decrypt method carried out between a client and the EWS.

Decrypt Method:

The decrypt method accepts as input an encrypted data envelope and returns the data embedded in it if the calling user is granted access by the envelope authorization information. The decrypt method processing includes the following exemplary steps as shown in flowchart 170, in FIG. 9:
1. Once the user has received the encrypted data envelope in a step 172, the user authenticates to the EWS, as described above;
2. After establishing a secure connection (e.g., a SSL transmission link) in a step 174, the user submits encrypted data envelope to the EWS in a step 176;
3. The EWS receives the encrypted data envelope in a step 178, and in a step 180, authenticates the calling user using an authentication service, if the user is not already authenticated and after decrypting;
4. The EWS extracts the user identity from the current session state as well as a FEK identifier that's part of the encrypted data envelope;
5. The EWS locates FEK in its local key store, using the FEK identifier;
6. If no FEK is found, an error is returned to the user;
7. Otherwise, the EWS decrypts the data of the encrypted data envelope into a memory buffer, using its symmetric encryption key (i.e., its public key), in a step 182;
8. The EWS also extracts and removes the signature value from the memory buffer;
9. Next, the EWS computes a SHA1 hash of memory buffer to generate a test signature;
10. The test signature is compared to the extracted signature in a step 184, and if the two signatures do not match, then an error is returned to the user in a step 188;
11. Otherwise, the authorization information is extracted from the memory buffer;
12. The EWS processes authorization information and looks up the user identity in access control list, in a step 186;
13. If the user requesting decryption is granted access, then the data are extracted from the memory buffer and returned to the user who made the request with status success in a step 190, so that the user receives the status code and the protected data in a step 192;
14. If the user is denied access to the data, an access denied error is returned to the user in step 190; and
15. The EWS then writes zeroes to clear the memory buffer and frees it.

Authorization Information Processing:

The authorization information specified during the encrypt method can be either an ACL that specifies the users who are granted access, or a pre-authenticated URL to a location where the ACL is hosted by an external authorization service or maintained on a remote web storage server. The EWS can use the HTTPS protocol when retrieving the authorization information from the URL location.

Figure 10:
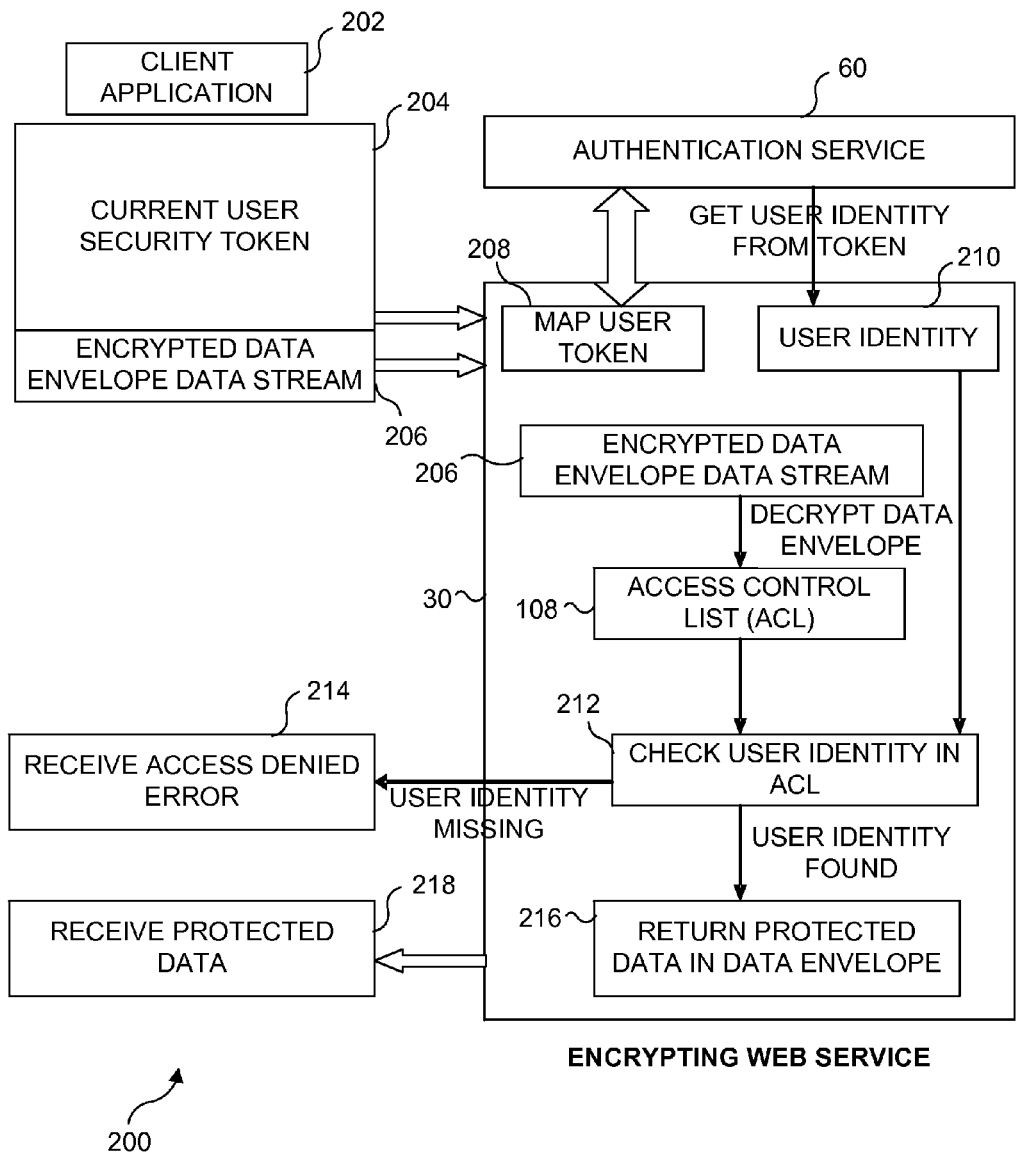
FIG. 10 is a block diagram showing an overview of the system state during the decrypt method, using a simple list of users in the access control list (ACL) as the authorization factor.

FIG. 10 is a functional block diagram 200 illustrating the processing of the decrypt method when the encrypted data envelope authorization information includes an ACL of authorized users. The user running a client application 202 is authenticated, as described above, and the decrypt method specifies a current user security token 204, which is provided to EWS 30 with an encrypted data envelope data stream 206. The EWS maps the user token to a user identity 210 (or email address) in a block 208 by contacting authentication service 60, which was used when signing in the user. The authentication returns user identity 210 to the EWS. Encrypted data envelope data stream 206 is decrypted to obtain ACL 108, so that the EWS can check to determine if the user identity is included in the list of users comprising the ACL in a block 212. The ACL is then searched for the user identity or email address. If not found, the requesting user/application receives an access denied error from the EWS in a block 214. The EWS then decrypts the encrypted data envelope and verifies its signature. If the user identity is found in the ACL and the signature is verified, then EWS 30 returns the protected data that was decrypted from the encrypted data envelope in a block 216. The requesting user/application receives the protected data in a block 218. Alternatively—for the case in which the encrypted data envelope includes the FEK, but not the protected data, if the operation succeeds, the user can be granted access to the protected data in the encrypted data envelope by simply returning the FEK to the user to employ in decrypting the encrypted file.

Figure 11:
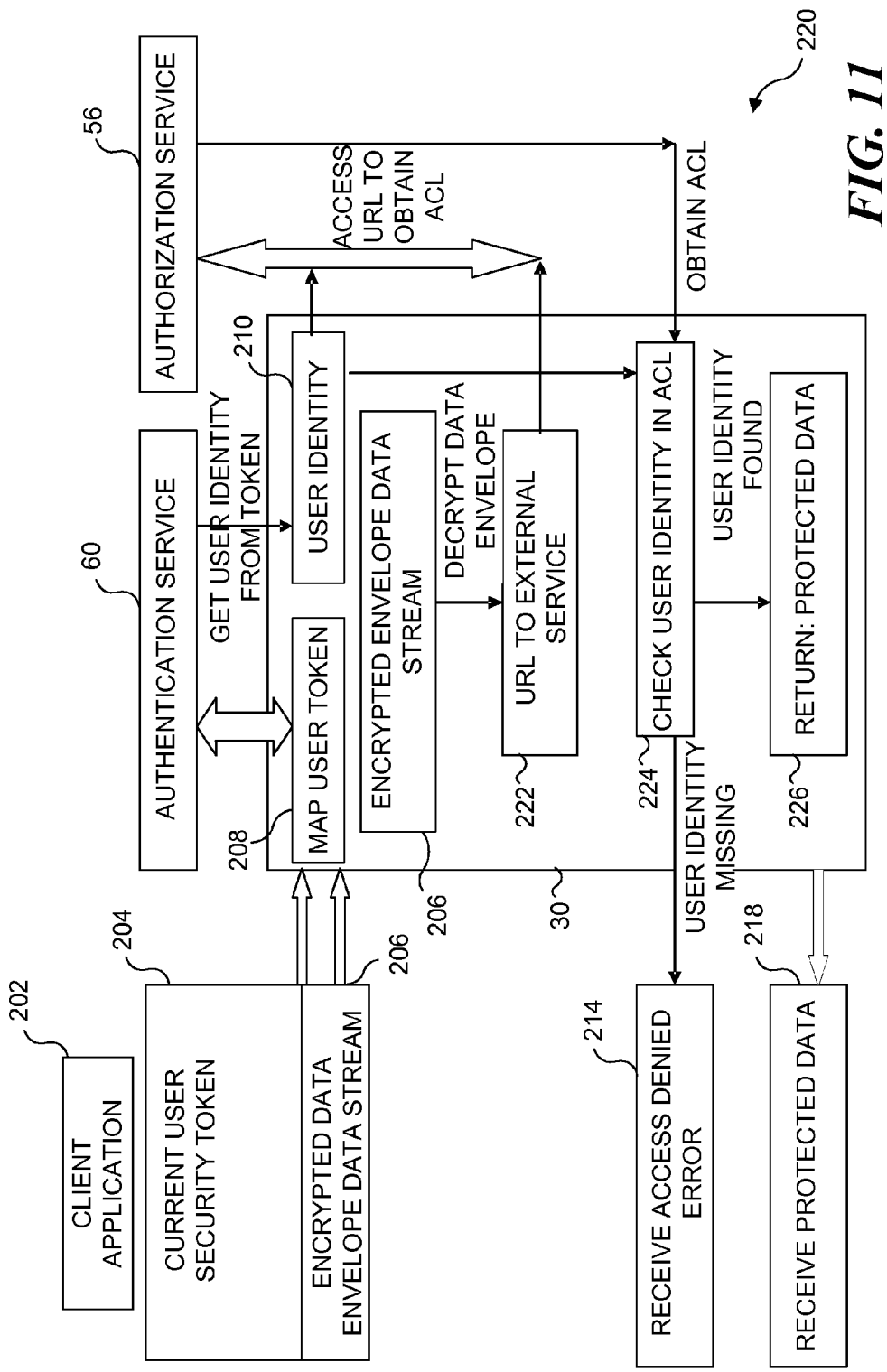
FIG. 11 is a block diagram showing an overview of the system state during the decrypt method, with a URL to an external authorization service for obtaining the ACL.

Similarly, FIG. 11 is a functional block diagram 220 illustrating the processing of the decrypt method when the encrypted data envelope authorization information comprises a pre-authenticated URL indicating the location of the ACL of authorized users. Much of this Figure is identical to FIG. 10 and the same reference numbers are employed. As before, current user token 204 provided to EWS 30 by client application 202 and is mapped to user identity 210 via the EWS with the aid of authentication service 60. Next, the encrypted data envelope is decrypted by the EWS, and its signature is verified. The URL is extracted from the authorization information that was conveyed in the encrypted data envelope, and the EWS establishes a secure connection to authorization service 56 specified by the URL address. The EWS issues a HTTP GET command to authorization service 56 at the URL in a block 222, and user identity 210 is appended to the GET command as a query parameter. The authorization service verifies the URL's authenticity and returns the ACL as expressed by the URL information. If the URL information is invalid, the authorization service returns an error, and the decrypt method aborts with an access denied error. Otherwise, the result of the HTTP GET command is the ACL that is searched for the user identity in a block 224, and if found, EWS 30 returns the protected data in a block 226, and the user receives the protected data in block 218. If the user identity is not found, an access denied error is returned to the user in block 214.

The service uses the following steps to process the authorization information as shown in FIGS. 10 and 11 and further summarized below.

1. If the authorization information represents an access control list of user identities then the current user identity is searched in the list;
   a. If the user identity is found, then the protected data are extracted from the memory buffer and returned to the user with status success; and
   b. If the user is not found, then an access denied error is returned to the user;
2. If the authorization information represents a URL then the EWS performs the following steps:
   a. The EWS connects to remote service as indicated by address in the URL, using HTTPS;
   b. The EWS issues a HTTP GET request on the URL, appending the decrypting user identity as a query parameter. The parameter name is "username" and value is user identity. For example, the URL is appended with the parameter as in: "username=example@mylivekey.com;"
   c. The EWS then receives either the resulting authorized list of users or an error code;
   d. If no response is received from remote location indicated by the URL within some configurable timeout, the request is aborted and failed;
   e. If an error is returned, then the response, access denied is returned to the user;
   f. If the HTTP GET request succeeds, then the ACL that is returned is searched for the decrypting user's identity;
   g. If the decrypting user's identity is found in the ACL, then the data are extracted from the memory buffer and returned with status success; and
   h. If the decrypting user is not found, then an access denied error is returned to the user.

Encoding Process of Encrypted Data Envelope:

An encrypted data envelope is built from the following data:
1. the user data;
2. the user authorization information;
3. the user identity, i.e., the identity of user who created the encrypted data envelope;
4. the time at which the encrypted data envelope was created, expressed in seconds since 1970 00:00:00; and
5. the Internet Protocol (IP) address of client computer from which the encrypt request is received.

Figure 12:
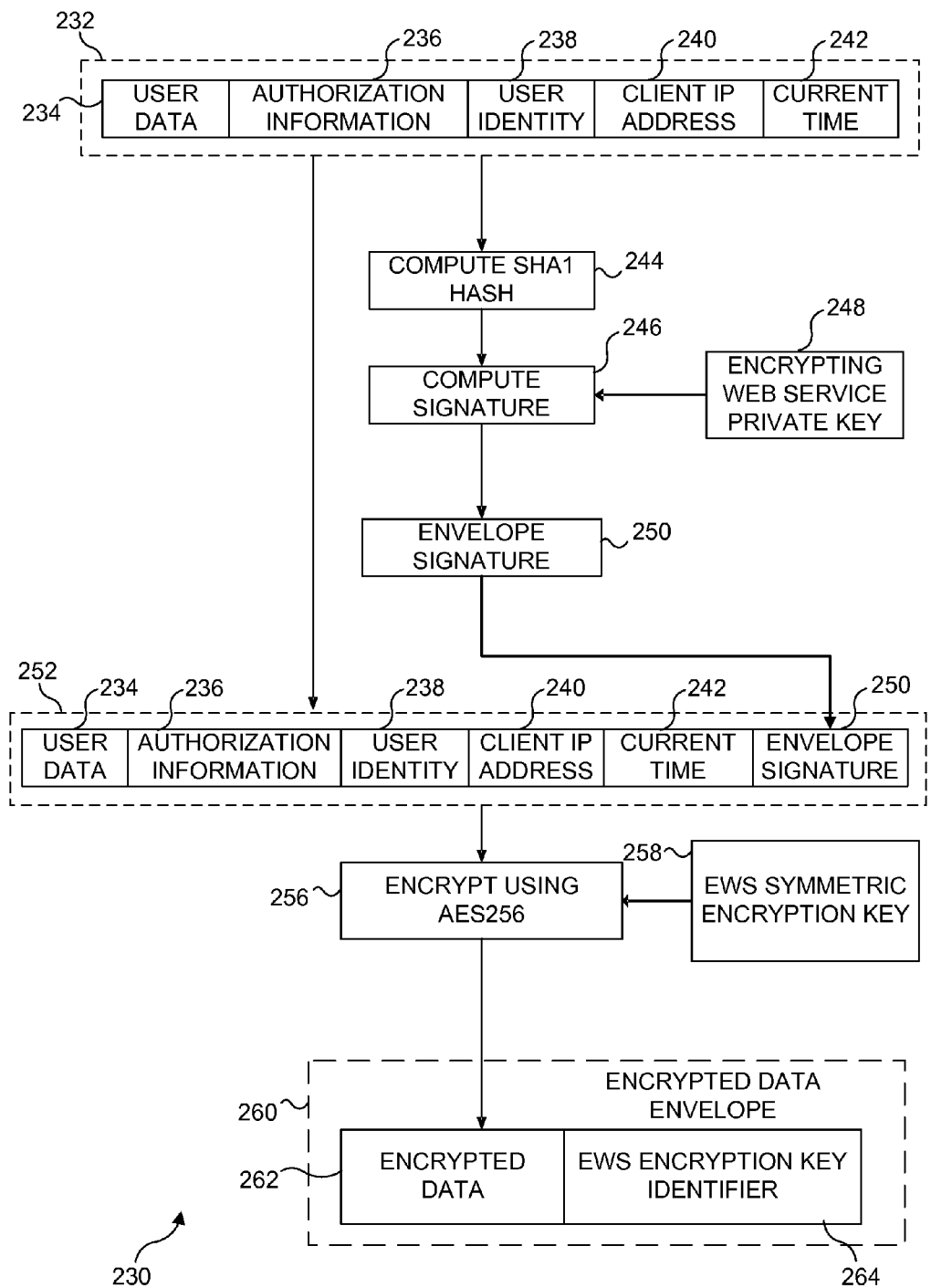
FIG. 12 is a block diagram illustrating an exemplary internal structure of an encrypted data envelope and an exemplary encoding process used during the encrypt method.

Exemplary steps 230 employed to create an encrypted data envelope from the above fields are shown in FIG. 12. User data 234, authorization information 236, user identity 238, client IP address 240, and current time 242 are packaged into a single buffer 232. Next, a SHA1 hash of the buffer is computed in a step 244 and the hash is signed with an EWS private key 248 in a step 246, to produce an encrypted data envelope signature 250. This signature protects the encrypted data envelope from tampering. The signature is then added to buffer 232, producing a new buffer package 252.

New buffer package 252 is then encrypted with an EWS symmetric encryption key 258, in a step 256, using AES256 (or any other suitable encryption algorithm). A resulting encrypted data stream 262 is then augmented with a EWS key identifier 264 for the symmetric key, to produce final encrypted data envelope 260. The key identifier is required to be part of the envelope because the EWS may maintain multiple encryption keys. At decrypt time, the right EWS key must be identified for use in decrypting the encrypted data envelope.

Figure 13:
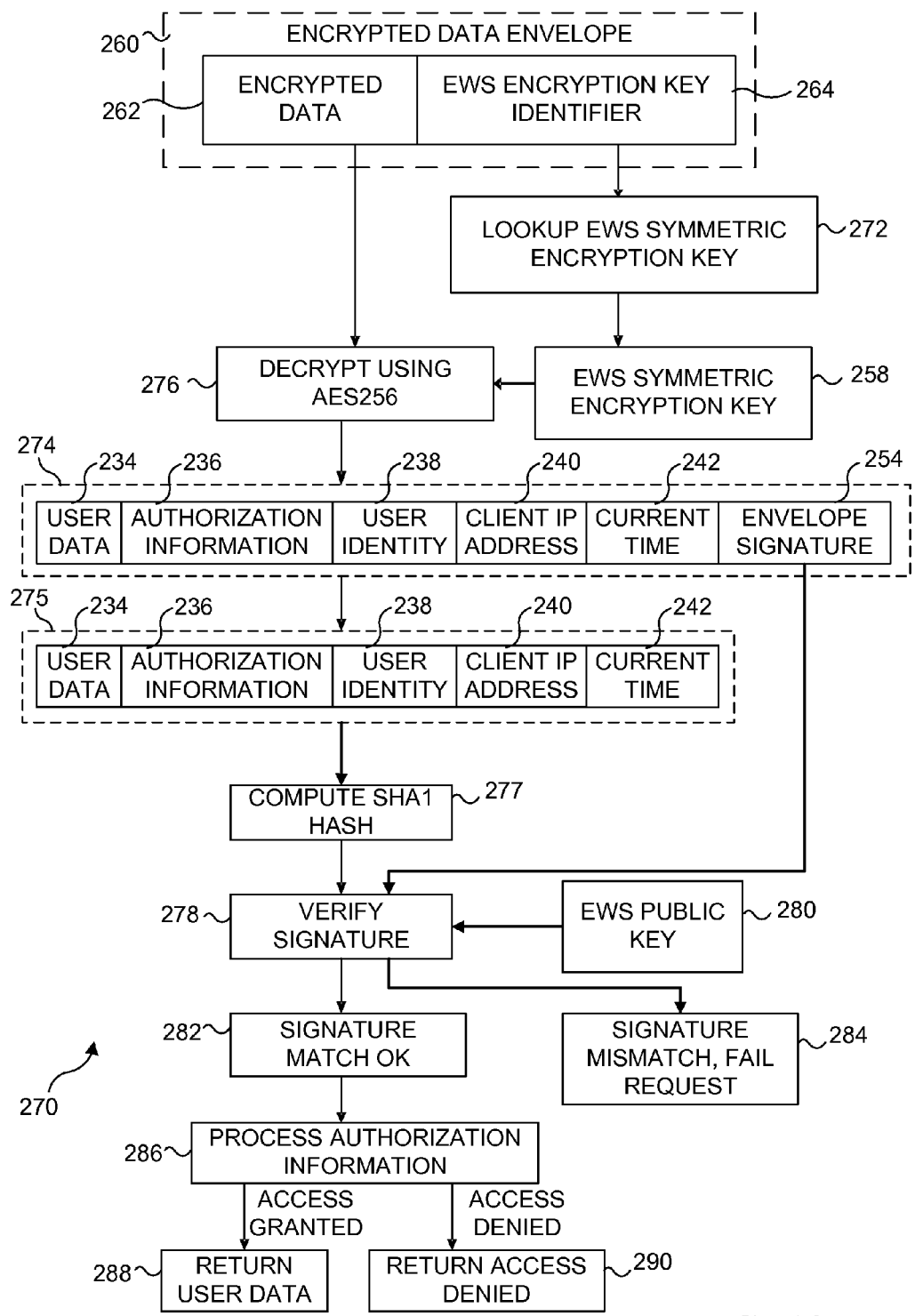
FIG. 13 is a flowchart showing exemplary logical steps implemented to process an encrypted data envelope during the decrypt method.

Process for Decrypting the Encrypted Data Envelope:

An encrypted data envelope is received and processed during the decrypt method. FIG. 13 shows exemplary steps 270 that are used to process encrypted data envelope 260. Where appropriate, common reference numbers are used in FIGS. 12 and 13. The EWS executes the following steps to decrypt the encrypted data envelope:
1. Extract EWS encryption key identifier 264 from encrypted data envelope 260;
2. Lookup EWS symmetric encryption key 258 using identifier in EWS key store in a step 272;
3. If EWS symmetric encryption key is not found, then return an error;
4. Decrypt encrypted data part of the encrypted data envelope into a memory buffer 274 using EWS symmetric encryption key and ADS256 (or other suitable) algorithm in a step 276;
5. Extract and remove envelope signature 254 from memory buffer 274, providing a new buffer package 275;
6. Compute SHA1 hash of new memory buffer 275 in a step 277;
7. Verify the signature of the memory buffer using a SHA1 hash, the extracted signature, and EWS public key 280 in a step 278;
8. If the two signatures do not match, then return an error in a step 284; otherwise, proceed with a step 282 if the signatures match;
9. Extract the user authorization information from new memory buffer package 275;
10. Process the authorization information against the current user identity in a step 286;
11. If the user is granted access then return the user data in a step 288; and
12. Otherwise, return access denied in a step 290.

Exemplary Computing Device

Figure 14:
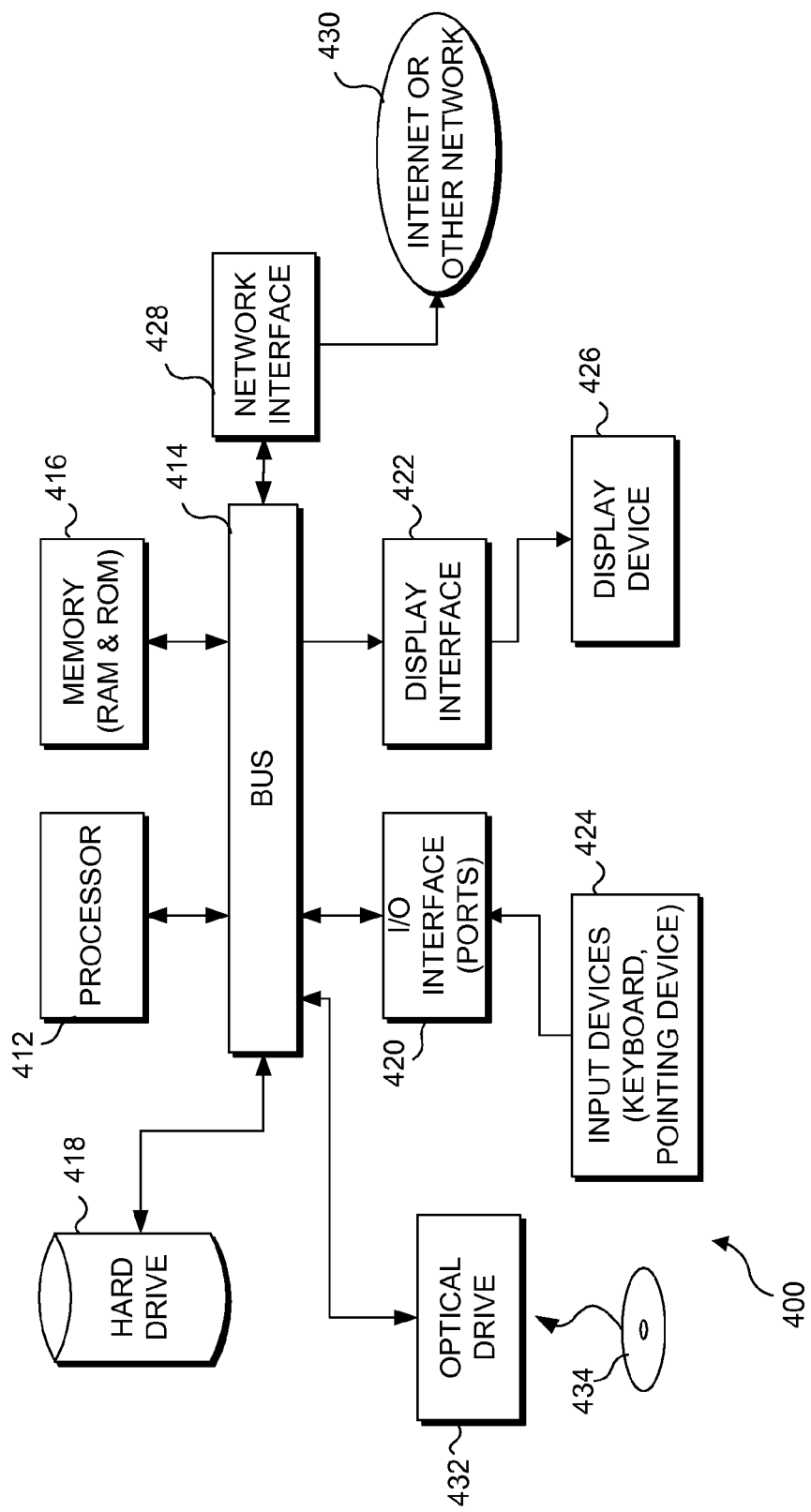
FIG. 14 is a functional block diagram of a generally conventional computing device that can be used for implementing the present novel approach.

FIG. 14 is a functional block diagram illustrating details of a computing device 400 that is useful for performing the functions relating to requesting that information to be protected be encrypted by a trusted EWS, or the functions related to requesting access to the information included within an encrypted data envelope, or the functions of a network device implementing the trusted EWS—all in connection with the present novel approach. Computing device 400 can be a typical personal computer (PC) of almost any form factor, including a laptop, a desktop, a server, or other type of general purpose computing device capable of executing one or more software programs to carry out specific portions (or all) of the novel approach described above, but can take other forms, such as a logic circuit or a hardwired device, that is suitable for carrying out the function implement in the present novel procedure.

In this exemplary embodiment of a computing device, a processor 412 is employed for executing machine instructions that are stored in a memory 416. The machine instructions may be transferred to memory 416 from a data store 418 over a generally conventional bus 414, or may be provided on some other form of memory media, such as a digital versatile disk (DVD), a compact disk read only memory (CD-ROM), or other non-volatile memory device. An example of such a memory medium is illustrated by a CD-ROM 434. Processor 412, memory 416, and data store 418, which may be one or more hard drives or other non-volatile memory, are all connected in communication with each other via bus 414. The machine instructions in the memory are readable by the processor and executed by it to carry out the functions of the exemplary embodiments discussed above. Also connected to the bus may be a network interface 428 to enable communication with a network 430 (or the Internet), an input/output interface 420 (which may include one or more data ports such as any of a serial port, a universal serial bus (USB) port, a Firewire (IEEE 1394) port, a parallel port, a personal system/2 (PS/2) port, etc.), and a display interface or adaptor 422.

Any one or more of a number of different input devices 424 such as a keyboard, mouse or other pointing device, trackball, touch screen input, etc., are connected to I/O interface 420. A monitor or other display device 426 is coupled to display interface 422, so that a user can view graphics and text produced by the computing system as a result of executing the machine instructions, both in regard to an operating system and any applications being executed by the computing system, enabling a user to interact with the system. An optical drive 432 is included for reading (and optionally writing to) CD-ROM 434, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A computer-implemented method for protecting information exchanged between entities, comprising:
   as implemented by one or more computing devices configured with specific executable instructions,
   receiving, by a trusted service via a secure transmission from a first entity over a communication link:
      information that is to be protected; and
      authorization information that can be used to determine who is authorized to access the information;
   encrypting, by the trusted service, both the information that is to be protected and the authorization information, within an encrypted data envelope;
   securely transmitting, by the trusted service, the encrypted data envelope to the first entity over a communication link, so that the first entity can subsequently convey the encrypted data envelope to one or more other entities authorized to access the information being protected;
   receiving, by the trusted service, the encrypted data envelope securely transmitted by a second entity over a communication link;
   decrypting, by the trusted service, the encrypted data envelope in order to access the authorization information;
   using the authorization information, by the trusted service, for determining if the second entity is authorized to access the information in the encrypted data envelope;
   if the second entity is authorized to access the information in the encrypted data envelope, then:
      decrypting, by the trusted service, the encrypted data envelope to access the information; and
      securely transmitting, by the trusted service, the information to the second entity over a communication link; and
   if the second entity is not authorized to access the information in the encrypted data envelope, then returning, by the trusted service, an access denied status to the second entity.

2. The computer-implemented method of claim 1, wherein the authorization information comprises at least one item selected from the group of items consisting of:
   an access control list that indicates one or more entities authorized to access the information; and
   a network address indicating a location of an access control list that indicates one or more entities authorized to access the information.

3. The computer-implemented method of claim 2, further comprising receiving, by the trusted service, the access control list from an authorization service at the location indicated by the network address, the access control list indicating the one or more entities authorized to access the information.

4. The computer-implemented of claim 1, wherein the trusted service comprises an encrypting web service (EWS), and wherein the information to be protected and the authorization is received from the first entity over a public network, using a secure communication link.

5. The computer-implemented method of claim 1, wherein the information to be protected comprises a file encryption key (FEK).

6. The computer-implemented method of claim 5, wherein the information returned from the trusted service to the second entity comprises the FEK, so that the second entity can use the FEK to decrypt the encrypted file to access the data included therein.

7. The computer-implemented method of claim 1, wherein at least one of the first entity and the second entity comprises a software program executing on a computing device.

8. The computer-implemented method of claim 1, further comprising digitally signing, by the trusted service, the information that is to be protected and the authorization information to produce a digital signature, before producing the encrypted data envelope that is returned to the first entity, the digital signature being included in the encrypted data envelope.

9. The computer-implemented method of claim 8, further comprising, in response to receiving the encrypted data envelope from the second entity:
   extracting, by the trusted service, the digital signature included in the encrypted data envelope after decrypting the encrypted data envelope;
   digitally signing, by the trusted service, the authorization information and information to be protected that were in the encrypted data envelope that has been decrypted to produce a test signature;
   comparing, by the trusted service, the test signature with the signature that was extracted; and
   returning, by the trusted service, an access denied status to the second entity if the test signature does not match the signature extracted, to indicate that the second entity is not authorized to access the information in the encrypted data envelope, and continue with processing the request for decrypting the encrypted data envelope, if the test signature matches the signature extracted.

10. The computer-implemented method of claim 1, Further comprising establishing, by the trusted service, communications with an authentication service to confirm an identity of the second entity before enabling the second entity to access the information in the encrypted data envelope.

11. The computer-implemented method of claim 10, further comprising:
   receiving, by the trusted service, a current user token from the second entity;
   attempting, by the trusted service, to map the current user token to a user identity maintained by the authentication service; and
   returning, by the trusted service, an access denied status if the current user token cannot be mapped to a user identity maintained by the authentication service, to indicate that the second entity is not authorized to access the information in the encrypted data envelope, and otherwise, returning the information to the second entity.

12. The computer-implemented method of claim 1, wherein a first computing device of the one or more computing devices generates the encrypted data envelope, and wherein a second computing device of the one or more computing devices decrypts the encrypted data envelope.

13. A system for protecting information exchanged between entities, comprising:
   a first computing device associated with a first entity, the first computing device comprising a network interface for communicating over a network, a memory in which machine executable instructions are stored, and a processor connected to the network interface and the memory, the processor executing the machine executable instructions stored in the memory to carry out a plurality of functions, including:
      enabling the first entity that is using the first computing device to securely transmit an encrypt request to a trusted service over the network, the encrypt request comprising information that is to be protected, as well as authorization information that can be used to determine who is authorized to access the information; and
      receiving an encrypted data envelope from the trusted service via a secure transmission over the network, the encrypted data envelope including the information that is to be protected and the authorization information; and
   a second computing device associated with the trusted service, the second computing device comprising a second network interface for communicating over the network, a second memory in which machine executable instructions are stored, and a second processor connected to the second network interface and the second memory, the second processor executing the machine executable instructions stored in the second memory to carry out a plurality of functions, including:
      receiving the encrypt request from the first entity
      encrypting the information that is to be protected and the authorization information, to produce the encrypted data envelope;
      securely transmitting the encrypted data envelope to the first entity over the network, so that the first entity can subsequently convey the encrypted data envelope to one or more other entities authorized to access the information being protected; and
      in response to a decrypt request securely transmitted over the network from a second entity, the decrypt request including the encrypted data envelope:
         decrypting the encrypted data envelope in order to access the authorization information;
         using the authorization information to determine if the second entity is authorized to access the information in the encrypted data envelope;
         if the second entity is authorized to access the information in the encrypted data envelope, then:
            decrypting the encrypted data envelope to access the information; and
            securely transmitting the information to the second entity over the network; and
         if the second entity is not authorized to access the information in the encrypted data envelope, then returning an access denied status to the second entity.

14. The system of claim 13, further comprising a third computing device associated with the second entity, the third computing device comprising a third network interface for communicating over the network, a third memory in which machine executable instructions are stored, and a third processor connected to the third network interface and the third memory, the third processor executing the machine executable instructions stored in the third memory to carry out a plurality of functions, including:
   enabling the second entity who has the encrypted data envelope to securely transmit the decrypt request to the trusted service over the network; and
   receiving the information that was protected in the encrypted data envelope from the trusted service by a secure transmission over the network, if the trusted service has determined that the second entity is authorized to receive the information.

15. The system of claim 14, wherein the machine executable instructions executed by the third processor cause it to transmit a current user token for the second entity to the trusted service with the decrypt request, and wherein the machine instructions executed by the second processor cause it to attempt to map the current user token to a user identity maintained by an authentication service to:
   return an access denied status to the second entity if the current user token cannot be mapped to a user identity maintained by the authentication service, to indicate that the second entity is not authorized to access the information in the encrypted data envelope; and otherwise,
   return the information requested to the second entity.

16. The system of claim 13, wherein the authorization information comprises at least one item selected from the group of items consisting of:
   an access control list that indicates one or more entities authorized to access the information; and
   a network address indicating a location on the network of an access control list that indicates one or more entities authorized to access the information.

17. The system of claim 16, wherein the machine instructions stored in the second memory that are executed by the second processor further cause it to employ an authorization service at the location indicated by the network address, to provide the access control list that indicates the one or more entities authorized to access the information.

18. The system of claim 13, wherein the machine instructions stored in the memory of the first computing device used by the first entity further enable the first entity to employ a file encryption key (FEK) to encrypt data, producing encrypted data that will be conveyed to the one or more other entities, the information to be protected comprising the FEK.

19. The system of claim 18, wherein the encrypted data envelope is included in a logical file structure of an encrypted file that includes the encrypted data, for conveyance to the one or more other entities.

20. The system of claim 19, wherein the information returned by the trusted service to the second entity comprises the FEK, and wherein the FEK can be used to decrypt the encrypted file, to access the data included therein.

21. The system of claim 13, wherein at least one of the first entity and the second entity comprises a software program executing on a corresponding at least one of the first computing device and the third computing device.

22. The system of claim 13, wherein the machine instructions stored in the second memory of the second computing device further cause the second processor to digitally sign the information that is to be protected and the authorization information to produce a digital signature, before producing the encrypted data envelope that is returned to the first entity, the digital signature being included in the encrypted data envelope.

23. The system of claim 22, wherein after receiving the decrypt request from the second entity, the machine instructions stored in the second memory of the second computing device further cause the second processor to:
- extract the digital signature included in the encrypted data envelope after decrypting the encrypted data envelope;
- digitally sign the authorization information and information to be protected that were in the encrypted data envelope that has been decrypted to produce a test signature;
- compare the test signature with the signature that was extracted; and
- return an access denied status to the second entity if the test signature does not match the signature extracted, to indicate that the second entity is not authorized to access the information in the encrypted data envelope, and continue with processing the decrypt request, if the test signature matches the signature extracted.

24. The system of claim 13, wherein the machine executable instructions executing on the second processor of the second computing device cause the second processor to communicate with an authentication service to confirm an identity of the second entity before enabling the second entity to access the information in the encrypted data envelope.

25. The system of claim 13, wherein the machine instructions stored in the second memory that are executed by the second processor further cause it to decrypt an encrypted data envelope generated by a third computing device.

\* \* \* \* \*